July 14, 1936.  R. C. SCHEMMEL  2,047,747
TRIMMING MOLDING
Filed Nov. 15, 1933
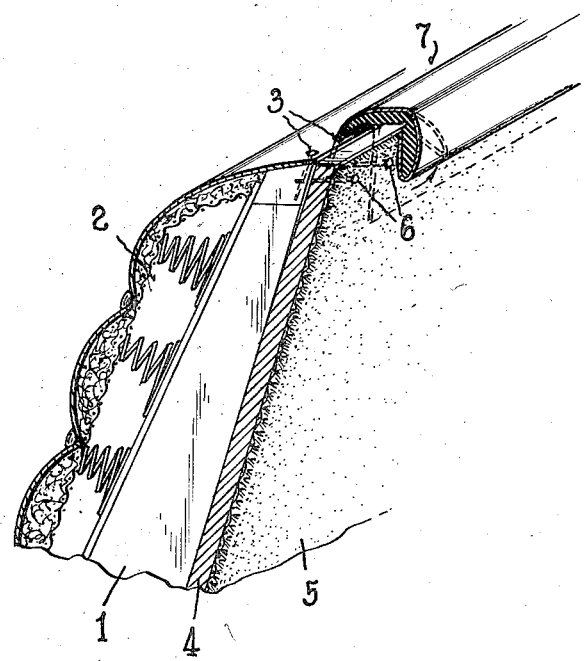
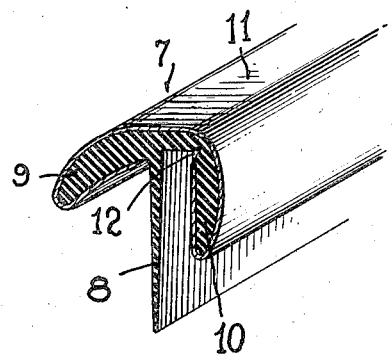
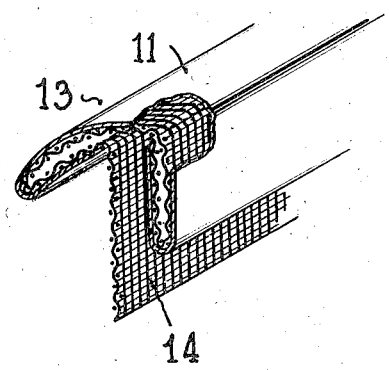
Robert C. Schemmel
INVENTOR
BY Dyre & Kirchner
ATTORNEYS Patented July 14, 1936

2,047,747

UNITED STATES PATENT OFFICE 2,047,747

TRIMMING MOLDING

Robert C. Schemmel, Union City, Ind.

Application November 15, 1933, Serial No. 698,197

5 Claims. (Cl. 155—184)

My invention relates to trimming devices, and more particularly to a trimming strip or molding having a variety of uses and being particularly adapted to be applied to automobile seats for the purpose of covering and trimming the juncture of two surface portions of the seat, such as the back and the front portions.

A particular object of the invention is to provide a trimming instrumentality of the class thus generally indicated which contains a portion adapted to be secured to the object to be trimmed, and having another portion or portions adapted to overlie and conceal the meeting edges of elements of the object to be trimmed. In a specific and preferred embodiment of the invention I form the device of resilient material, and may include in it a line along which the material of a trimming portion of the body is weakened, in order that such portion may be temporarily lifted to permit fastening means, such as nails, tacks or the like, to be passed through a part of the object to be trimmed, and another portion of the trimming body. In the best form in which I have embodied the invention the trimming body is made resilient so that after the deformation just described the temporarily lifted trimming portion will, by the inherent resilience of its material, spring back into its original place and position. In another useful embodiment of the invention the material of the device is flexible merely, so that after the deformation incident to the fastening operation the trimming portion of the body may be manually or mechanically bent back into the place and position in which it is ultimately desired.

A fundamental purpose of the instrumentality contemplated by the present invention is the trimming of two adjacent portions of a composite article, like the front and back fabric covering of an automobile seat, and the concealing of the means, such as nails, tacks or the like, used to secure the two portions together, as well as the concealing of any raw edges in which the two portions may terminate, and a special object of the invention is to provide such an instrumentality in which the part which connects the trimming device to the object to be trimmed is completely concealed in use.

With these and other objects in view, the invention comprises the novel features and structural parts hereinafter defined in terms of certain specific and preferred embodiments.

In the accompanying drawing which forms part of this application for Letters Patent, Figure 1 is a partly vertical sectional, and partly perspective, view of a part of an automobile seat with the novel trimming applied thereto;

Fig. 2 is a perspective view, with one end in cross section, of a preferred embodiment of the trimming molding; and Fig. 3 is a similar view of an alternative form of trimming molding.

Fig. 1 shows an embodiment of my invention mounted on the back of an automobile seat of usual construction, in which 1 designates framework of wood or the like comprising a series of vertical members surmounted by a top cross member. To the front of this framework is applied the usual upholstery assembly 2, including spiral springs, padding and a fabric covering fastened by nails, tacks or the like 3 to the top cross member of the framework. The back of the seat is closed by the panel 4, of fibre board, plywood or some similar material, faced with a finishing fabric 5, shown in the drawing as pile fabric, which may be glued to the panel 4.

The back panel is secured to the framework 1 by nails, tacks or the like 6 passed through the edge of the panel and into the framework 1.

An object of the present invention is to finish or trim the meeting edges of the front and back elements of the seat, i. e., to cover the margins of the front upholstery fabric and the back panel, together with the fastening elements 3 and 6 which secure these elements together.

To this end the invention includes a body designated generally 7 in Figs. 1 and 2, comprising a web 8 which is adapted to be received between the two adjacent elements of the seat or other object to be trimmed. From an edge of the web 8 two lips 9 and 10 extend in substantially opposite directions. Each of these lips is adapted to overlie one of the elements of the object to be trimmed, specifically in the illustration the margin of the front portion of the seat and the margin of the back panel. The two lips are preferably encased in a covering 11 of leather, imitation leather, ornamental fabric or the like.

The body of the trimming element 7 is preferably made of rubber or rubber composition to render the structure resilient for a purpose hereinafter explained. It will be obvious that since the cross section of the trimming body is uniform throughout, strips of the body of indefinite length may be extruded from a suitable die. Of course the body may be molded if desired, or it may be built up of separate portions cemented or otherwise secured together.

It is to be understood that the specific form and shape of the lips 9 and 10 is not of the essence of the invention broadly considered. As shown in the exemplification illustrated the forward lip 9 extends almost horizontally from the top edge of the web 8, but is provided with a slightly downward inclination in order that it may snugly engage the curved margins of the front upholstery; and the rear lip 10 is shown as right angular, including a horizontal portion adjacent the web 8 and a vertical portion at the edge of the lip.

The trimming molding is applied in the assembling of the seat by inserting the web 8 between the panel 4 and the upper edge of the framework 1 after the tacks 3 have been driven through the front covering fabric and into the framework. Lip 10 is then temporarily lifted or deformed from its normal position and relationship to the rest of the trimming body, and tacks 6 are driven through the panel and the web into the framework 1. Upon release of the lip 10 the resilience of the material causes it to spring back into its normal position and relationship to the rest of the trimming body, so that the upper margin of the panel 4 is, in the embodiment shown in Figs. 1 and 2, snugly received within the pocket formed by lip 10 and web 8, and the raw edge of the panel and the tacks 6 are completely concealed.

I prefer to form the lip 10 with a weakened portion along a line 12, effected by making the body of the lip relatively thin along this line. This expedient facilitates the deformation of the lip during the act of applying tacks 6, causing the lip to bend straight along line 12.

In Fig. 3, I have illustrated a modification, generally indicated by the reference numeral 13. The molding there shown is of substantially the same shape and appearance as the molding 7, but the molding 13 is formed, not of a resilient material, but of a folded strip of fabric. With the fabric is incorporated means for rendering it pliable, preferably comprising transverse wire threads 14 either woven into the fabric and forming part of it, or secured to a surface of the fabric. The wires 14 are pliable, thus holding the body of the trimming molding 13 into any form into which it may be bent. The usual covering material 11 encases the lips of the body. The molding 13 is applied and used exactly like the molding 7, the substantially central web being inserted between the adjacent parts of the object to be trimmed and the two lips covering the margins of the parts. In the illustrated embodiment either of the lips may be forcibly deformed during the application of tacks like those shown at 6 in Fig. 1, after which the lip may be bent back into its normal position and relationship to the other portions of the body. The pliable wire elements 14 operate to hold the lip in position, as will be readily understood.

While I have illustrated the invention in two useful forms of embodiment, it will be obvious that other specific embodiments may be devised within the broad limits of the invention as defined by the appended claims, and all such modifications, to the extent that they embody the principles of the invention as pointed out in the claims, are deemed to be within the scope and purview thereof.

I claim:

1. A trimming molding comprising a relatively flexible body having a substantially central, thin, flat-surfaced web adapted to be inserted between two adjacent elements of the object to be trimmed and having lips oppositely extended from an edge of the web, each lip being adapted to overlie one of the elements of the object, and at least one of the lips having a portion substantially parallel with the web and forming therewith a pocket to receive an element of the object to be trimmed, said portion of said lip being adapted to be temporarily deformed from its normal relation to the web to permit fastening means to be passed through the last named element of the object and the web and being adapted to be disposed thereafter in its normal relation to the web.

2. A trimming molding comprising a body having a relatively thin, flat-surfaced and substantially central web adapted to be received between two adjacent elements of the object to be trimmed and having lips oppositely extending from an edge of the web, each lip being adapted to overlie one of the elements of the object and one of the lips being extended in spaced parallelism to the web to form therewith a channel, in combination with a plurality of pliable wires extending transversely across the last named lip adapting said lip to be deformed from its normal relation to the remainder of the body to permit fastening means to be passed through one of the elements of the object and the web, said lip being adapted to be subsequently restored to its normal position.

3. A trimming molding as claimed in claim 1, in which the deformable lip is weakened by being reduced in thickness along a longitudinal line at its bend to facilitate deformation.

4. A trimming molding comprising a flexible body having a relatively thin, substantially central, flat-surfaced web adapted to be received between two adjacent elements of the object to be trimmed and to be penetrated at any point by a nail or the like, said body having lips oppositely extended from an edge of the web, each lip being adapted to overlie one of the elements of the object, one of said lips having a portion substantially parallel with the web and forming therewith a pocket to receive an element of the object to be trimmed, said portion of said lip being capable of being lifted temporarily from the adjacent element of the object to permit said nail or the like to be driven through the web and into the other element of the object.

5. A trimming molding comprising a relatively flexible body having a relatively thin central web adapted to be inserted between two adjacent elements of the object to be trimmed without substantial separation of said elements and having flexible lips oppositely extended from an edge of the web, each lip being adapted to overlie one of the elements of the object, one lip being extended in spaced relation to the web and parallel therewith to form therewith a channel for receiving one of the elements of the object.

ROBERT C. SCHEMMEL.